Patented Feb. 28, 1939

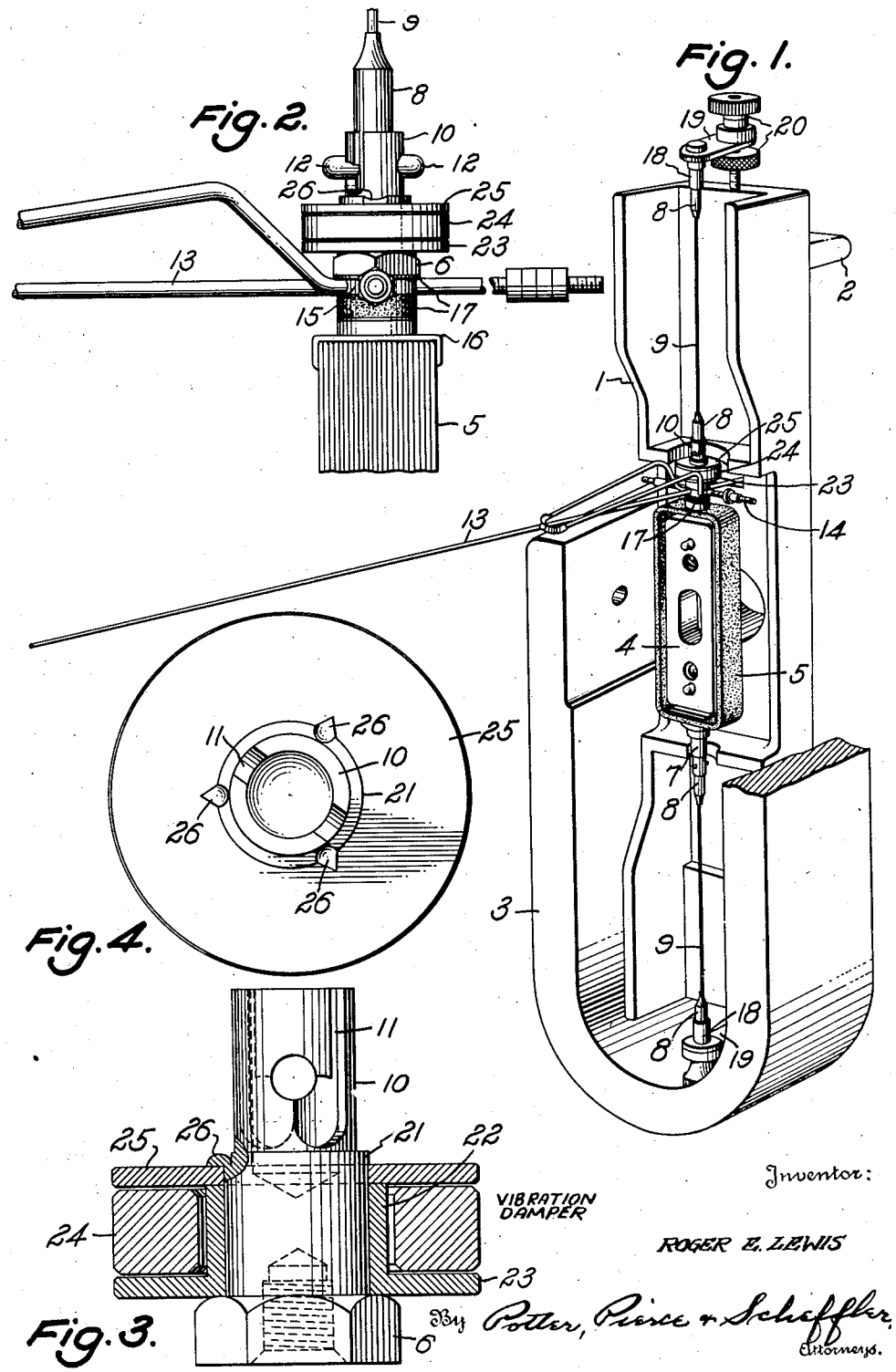

2,149,244

UNITED STATES PATENT OFFICE 2,149,244

GALVANOMETER

Roger E. Lewis, Elizabeth, N. J., assignor to Weston Electrical Instrument Corporation, Newark, N. J., a corporation of New Jersey Application August 30, 1937, Serial No. 161,691

7 Claims. (Cl. 171—95)

This invention relates to galvanometers and more particularly to suspension galvanometers with pointers.

The moving system of the suspension type galvanometer responds to mechanical vibrations of its supporting structure. Vibrations of a transient nature usually give rise to a damped disturbance at the pointer tip while a sustained source of excitation at a constant frequency may, if related to the natural response period of the galvanometer, set up sustained vibrations at the pointer tip. Disturbances of this nature establish a false or unstable zero position of the pointer which is particularly objectionable in the case of a recording instrument.

Recorders which include a suspension galvanometer with a pointer, and mechanism for periodically depressing the pointer tip to engage or to control contacts, are frequently installed in factories where vibration is serious. A false "zero" position of the pointer causes an erratic hunting of the slide wire balancing motor and consequently results in an erratic chart record.

An object of this invention is to provide a suspension galvanometer which includes a device for damping the transmission of mechanical vibrations through the suspensions. An object is to provide a suspension galvanometer which includes a small inertia body loosely mounted on the moving system. More specifically, an object is to provide a suspension galvanometer in which the top pivot base nut carries a vibration damper in the form of a free washer or ring coaxial with the moving system of the instrument, the arrangement being such that the washer moves with the base nut when the moving system changes position slowly due to current flow in the moving coil but lags behind the rapid movements of the coil that are due to external disturbances.

These and other objects and advantages of the invention will be apparent from the following specification when taken with the accompanying drawing in which:

Fig. 1 is a perspective view, with parts broken away, of a suspension galvanometer embodying the invention;

Fig. 2 is an enlarged side elevation of the upper end of the moving system of the instrument;

Fig. 3 is a side elevation, with parts in section, of the upper pivot base nut and the vibration damper carried thereby; and Fig. 4 is an enlarged top view of the base nut and vibration damper.

In the drawing, the reference numeral 1 identifies the base of molded insulating material which carries the several instrument parts. An integral bracket 2 projects rearwardly from the top portion of the base and serves, with a similar lower bracket (not shown) to support the base and instrument assembly within a case. The permanent magnet 3 and core 4 are secured to the base 1 in the usual manner. The mounting members and the pole piece at the far side of the instrument have been omitted from the drawing for the better illustration of other parts as the exact design of the mounting means and the magnetic system form no part of the present invention.

The moving coil 5 has upper and lower pivot base nuts 6, 7 which terminate in tubular sockets for receiving the plugs 8 at the ends of the suspension ribbons 9. As shown in Figs. 2 to 4 with reference to the top pivot base nut, the tubular sockets 10 have diametrically opposed bayonet slots 11 in which the transverse pins 12 of the plugs 8 are engaged. The pointer 13 and balancing arms 14 are carried by a collar 15 that is secured to the top pivot base 16 by the nut 6. Insulating washers 17 are located at each side of the collar 15 as the electrical connections are made to coil 5 in the usual way through the suspension ribbons and pivot base nuts. The plugs 8 at the opposite ends of the suspension ribbons are mounted in sockets 18 of brackets 19 which are carried by the base 1, at least one of these brackets being adjustable, by nuts 20, to permit assembly and to control the tension in the ribbons.

The parts, so far as described, will be recognized as typical of the known suspension galvanometers. Such details as the electrical connections to the brackets 18 to pass current to the coil 5, and the torsion head for rotating the upper socket 17 in the case of a recording instrument have not been illustrated as these features are well known and form no part of this invention.

The vibration damper contemplated by this invention is mounted on the top pivot base nut 6 which usually has, or may be so shaped as to include, a cylindrical section 21 between the hexagonal section 6 and the socket 10. The damper comprises a sleeve 22 that fits snugly over the section 21 of the pivot base nut and has a lower flange 23 on which the washer or ring 24 rests. A cover washer 25 rests upon the sleeve 23 and is clamped to it by the deformed or staked over portions 26 of the cylindrical section 21 of the nut.

The entire vibration damper assembly is of small size and light weight. Typical overall dimensions for the unit are an axial length of about 0.10 inch and a diameter of about 0.33 inch. The housing is preferably formed of aluminum or an aluminum alloy and the ring 24 may be of brass and silver plated. The clearances to permit free movement of the ring 24 on its supporting sleeve and collar may be of the order of a radial gap of about 0.006 inch and a total axial gap of about 0.002 inch.

The operation of the device will be apparent from a consideration of the characteristics of a suspension galvanometer and its reaction to external mechanical vibration. Changes in current flow through the coil 5 results in a relatively slow angular movement of the coil. The washer 24 retains a fixed position with respect to the coil during such movements and therefore does not affect the current-produced deflection of the coil and its pointer. Mechanical vibrations transmitted to the coil through the suspension ribbons tend to produce rapid vibration of the coil, and the inertia of the ring 24 causes it to lag behind when the coil moves rapidly. The ring 24 thus absorbs, and then releases kinetic energy to its housing and the moving system during these differential movements. Some energy is dissipated through the friction between the ring and its housing, and a further damping effect arises from the out-of-phase movement of the ring and its housing which, due to the described construction, is compelled to move with the coil 5.

The coefficient of friction between the silvered and the aluminum surface is, of course, quite low and the mass of the ring 24 is small, but the forces tending to produce oscillation of the moving system are or can be reduced to a small order of magnitude by an appropriate "shock-proof" mounting of the galvanometer case. It is not practical to mount the instrument in such manner as to prevent mechanical vibrations when the building itself is subject to vibration, but the invention provides a means for eliminating the disturbing effects of the residual vibrations that are transmitted to the instrument. It is particularly to be noted that the invention does not require change in the general design or the specific construction of the suspension galvanometer. The vibration damper may be included in new constructions or added to existing instruments. The usual design of the pivot base nuts will permit the mounting of the damper assembly on the original base nut of an existing instrument but when this is not possible, the only additional element that need be supplied is a new pivot base nut.

It will be apparent that the inertial ring would be equally effective if mounted on the lower pivot base nut, and that other means could be employed for supporting the inertial weight for a frictionrestrained movement with respect to the galvanometer coil. The described construction is indicative of the invention, but it is to be understood that various modifications are contemplated by and fall within the spirit of the invention as set forth in the following claims.

I claim:

1. A suspension galvanometer comprising a magnetic system having a gap between poles thereof, a coil and means suspending the same for pivotal movement in said gap, and means for damping movement of said coil in response to vibrations transmitted thereto through said suspension means; said damping means including a support movable with said coil, and an inertial ring member resting upon said support.

2. In a suspension galvanometer, the combination with a magnetic system, a coil, and means including pivot base nuts suspending said coil for pivotal movement, of means for damping oscillation of said coil in response to vibrations transmitted thereto through said suspending means; said damping means comprising a ring member loosely supported on one of said pivot base nuts.

3. A suspension galvanometer as claimed in claim 2, wherein said ring member is supported on the top pivot base nut.

4. In a suspension galvanometer the combination with a coil and means including pivot base nuts suspending the same for pivotal movement, one of said nuts including a cylindrical section terminating in a socket, of vibration damping means comprising a sleeve on said cylindrical section and terminating in a radial flange, and an inertial weight member of annular form surrounding said sleeve and resting freely on said flange.

5. In a suspension galvanometer, the combination with a coil and means suspending the same for pivotal movement, of a housing secured to said suspension means for movement with said coil, and an inertial weight member loosely supported in said housing.

6. In a suspension galvanometer, the combination with a moving system including a coil having upper and lower pivot base nuts terminating in sockets, a base, and suspension ribbons carried by said base and connected to said sockets to provide a pivotal support for said coil, of vibration damping means including a support mounted on one of said nuts and having a radial flange, and an inertial weight of annular form loosely mounted on said support and resting upon said flange.

7. A suspension galvanometer as claimed in claim 6 wherein said support comprises a sleeve fitted over said nut, the axial length of said sleeve being greater than that of said inertial weight, a cover washer at the side of said weight opposite said flange, and means securing said cover washer and sleeve to said nut for movement therewith.

ROGER E. LEWIS.